(12) United States Patent
Hu et al.

(10) Patent No.: US 11,130,880 B2
(45) Date of Patent: Sep. 28, 2021

(54) LOW MELT PARTICLES FOR SURFACE FINISHING OF 3D PRINTED OBJECTS

(71) Applicant: Xerox Corporation, Norwalk, CT (US)

(72) Inventors: Nan-Xing Hu, Oakville (CA); Guerino G. Sacripante, Oakville (CA); Edward G. Zwartz, Mississauga (CA); Shivanthi E. Sriskandha, Mississauga (CA); Carolyn P. Moorlag, Mississauga (CA); Valerie Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 512 days.

(21) Appl. No.: 15/914,024

(22) Filed: Mar. 7, 2018

(65) Prior Publication Data

US 2019/0276700 A1   Sep. 12, 2019

(51) Int. Cl.
| | |
|---|---|
| *C09D 167/06* | (2006.01) |
| *C09D 5/03* | (2006.01) |
| *C08J 3/24* | (2006.01) |
| *B29C 64/141* | (2017.01) |
| *B33Y 10/00* | (2015.01) |
| *B33Y 70/00* | (2020.01) |
| *B29C 64/188* | (2017.01) |
| *B29C 64/153* | (2017.01) |
| *B29K 105/00* | (2006.01) |
| *B29K 67/00* | (2006.01) |

(52) U.S. Cl.
CPC .......... *C09D 167/06* (2013.01); *B29C 64/141* (2017.08); *B29C 64/153* (2017.08); *B29C 64/188* (2017.08); *B33Y 10/00* (2014.12); *B33Y 70/00* (2014.12); *C08J 3/24* (2013.01); *C09D 5/031* (2013.01); *C09D 5/033* (2013.01); *B29K 2067/00* (2013.01); *B29K 2105/251* (2013.01); *C08J 2367/06* (2013.01)

(58) Field of Classification Search
CPC .... C08J 3/126; C08J 2367/06; C08J 2467/06; C09D 167/06
See application file for complete search history.

(56) References Cited

U.S. PATENT DOCUMENTS

| | | | |
|---|---|---|---|
| 4,565,763 A | * | 1/1986 | Uchiyama .......... G03G 9/08793 430/109.3 |
| 5,278,020 A | | 1/1994 | Grushkin et al. |
| 5,290,654 A | | 3/1994 | Sacripante et al. |
| 5,308,734 A | | 5/1994 | Sacripante et al. |
| 5,344,738 A | | 9/1994 | Kmiecik-Lawrynowicz et al. |
| 5,346,797 A | | 9/1994 | Kmiecik-Lawrynowicz et al. |
| 5,364,729 A | | 11/1994 | Kmiecik-Lawrynowicz et al. |
| 5,370,963 A | | 12/1994 | Patel et al. |

(Continued)

*Primary Examiner* — Alexandre F Ferre
(74) *Attorney, Agent, or Firm* — Hoffman Warnick LLC (57) ABSTRACT

The present teachings include powder coating including a plurality of core/shell particles. Each particle of plurality of core/shell particles has a size of from about 3 microns to about 100 microns. Each particle of the plurality of core/shell particles has a core including a cross-linkable crystalline polyester resin having a melting temperature of less than about 150° C. Each particle of the plurality of core/shell particles has a shell including a cross-linkable amorphous polyester resin having a glass transition temperature greater than 40° C. Each particle of the plurality of core/shell particles includes a thermal initiator.

17 Claims, 1 Drawing Sheet

(56) References Cited

U.S. PATENT DOCUMENTS

| | | |
|---|---|---|
| 5,403,693 A | 4/1995 | Patel et al. |
| 5,418,108 A | 5/1995 | Kmiecik-Lawrynowicz et al. |
| 6,063,827 A | 5/2000 | Sacripante et al. |
| 8,663,886 B2 | 3/2014 | Vanbesien et al. |
| 2010/0055593 A1* | 3/2010 | Zhou .................. G03G 9/0825 430/108.4 |

\* cited by examiner

LOW MELT PARTICLES FOR SURFACE FINISHING OF 3D PRINTED OBJECTS

BACKGROUND

Field of Use

This disclosure is generally directed 3D objects. This disclosure also relates to processes products for making 3D objects.

Background 3D (three dimensional) printing (i.e. additive manufacturing (AM)) has been adapted for digital fabrication of parts/objects. However, 3D printed objects formed using printing techniques such as SLS (Selective Laser Sintering), FDM (Fused Deposition Modeling), as well binder jet and multi-jet modeling, often end with a 3D printed object having a very rough surface. Many surface finishing techniques, including mechanical polish, post heat treatment, solvent etching or vapor smoothing, are utilized for 3D printed objects. In addition, manual coating of liquid epoxy has also been used to smooth the surface of the 3D printed objects. These surface finishing techniques are tedious, time consuming, and not suitable for automation. Another issue associated with 3D printing is lack of color selection. As part of surface finishing, dying or manual painting is used to add color for final 3D printed objects. Therefore, there is a strong need for a surface finishing method for 3D printed parts/objects, which is simple, low cost, and suitable for automation.

SUMMARY

According to various embodiments, there is disclosed a powder coating including a plurality of core/shell particles. Each particle of plurality of core/shell particles has a size of from about 3 microns to about 100 microns. Each particle of the plurality of core/shell particles has a core including a cross-linkable crystalline polyester resin having a melting temperature of from about 40° C. to less than 150° C. Each particle of the plurality of core/shell particles has a shell including a cross-linkable amorphous polyester resin having a glass transition temperature greater than 40° C. Each particle of the plurality of core/shell particles includes a thermal initiator.

According to various embodiments, there is disclosed a three dimensional (3D) printing method. The method includes providing a 3D object and depositing a plurality of core/shell particles on a surface of the 3D object. Each particle of the plurality of core/shell particles include a core including a cross-linkable crystalline polyester resin having a melting temperature of less than 150° C. The shell of each core/shell particle includes a cross-linkable amorphous polyester resin having a glass transition temperature greater than 40° C. The core/shell particles include a thermal initiator. The method includes heating the article to a temperature of greater than 100° C. and less than 180° C. to cure the plurality of particles forming a surface coating of the 3D object.

A further aspect described herein is a powder coating composition including a plurality of core/shell particles. Each particle of the plurality of core/shell particles has a core of a cross-linkable crystalline polyester resin of fumaric acid and an aliphatic diol and a melting temperature of less than about 150° C. and a hardening agent. Each particle of the plurality of core/shell particles has a shell comprising a cross-linkable amorphous polyester resin and a glass transition temperature greater than 40° C. Each particle of the plurality of core/shell particles includes a thermal initiator.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the drawings have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Three-dimensional (3D) printing refers to processes in which various materials are used to create 3D objects. The materials are joined or solidified under computer control. The materials are added together (such as liquid molecules or solid grains being fused together). 3D printing is used in both rapid prototyping and additive manufacturing (AM). 3D objects can be of almost any shape or geometry and typically are produced using digital model data from a 3D model or another electronic data source such as an Additive Manufacturing File (AMF) file (usually in sequential layers). Thus, unlike material removed from a stock in the conventional machining process, 3D printing or AM builds a three-dimensional object from computer-aided design (CAD) model or AMF file, usually by successively adding material layer by layer.

FDM uses thermoplastic materials such as polylactic acid (PLA), acrylonitrile butadiene styrene (ABS), nylon, polyetherimide and acrylonitrile styrene acrylate (ASA). FDM 3D printing uses filaments that are unwound from a coil and supplied to an extrusion nozzle. The flow is turned on and off to deposit the material in the proper place. The nozzle is heated to melt the material. The thermoplastics are heated so that they soften and are deposited by an extrusion head. The nozzle can be moved in both horizontal and vertical directions by a numerically controlled mechanism. The nozzle follows a tool path controlled by a computer-aided manufacturing (CAM) software package, and the part is built from the bottom up, one layer at a time.

MJM (Multijet Printing) is an inkjet printing process that uses piezo printhead technology to deposit either photocurable plastics layer by layer. Materials include UV curable materials such as acrylates and methacrylates.

Selective laser sintering (SLS) is an additive manufacturing technique that uses a high power laser to fuse small particles together. Material options include plastic, metal, ceramic, nylon, polystyrene or glass powder. In many cases, SLS does not require any support structures, as parts are surrounded by unsintered powder at all times.

Powder bed and inkjet 3D printing, known variously as "binder jetting" and "drop-on-powder"—or simply "3D printing" (3DP)—is an additive manufacturing technology for making objects described by digital data such as a CAD file. An inkjet print head moves across a bed of powder, selectively depositing a liquid binding material. A thin layer of powder is spread across the completed section and the process is repeated with each layer adhering to the previous layer. When the 3D object is complete, unbound powder is automatically and/or manually removed in a process called de-powdering. The de-powdered part can optionally be subjected to various infiltrants or other treatments to produce properties desired in the final part.

3D printing creates objects having a roughened surface. For example, FDM (fused deposition modelling) leaves signature "corduroy" textured surfaces as a function of the layer-by-layer deposition of molten filament. MJM (multi-jet modelling) can have rough surfaces due to the co-printed support material which is later removed (usually by mechanical/thermal methods). This can leave a roughened interface. SLS (selective laser sintering) can also leave a pitted/roughened surface as well.

Powder coating can be used for surface finishing of 3D printed objects. Powder coating offers several advantages including no volatile organic compounds (VOCs). Powder coating can be low cost, fast and simple and can use relatively large size particles to smooth a rough surface. Powder coating can be used on 3D objects having various geometries and is suitable for automation. The particles used in powder coating can be made with different colors and effects. In powder coating, the powder particles are applied onto the coating object by electrostatic deposition or exposing the pre-heated object to a fluidized powder bed, followed by a curing step for final finishing.

Electrostatic powder deposition is well suited for surface finishing of 3D printed objects with conductive surface. For powder coating on non-conductive surfaces, two approaches can be used: pre-heat the 3D object to specified temperature, followed by dipping the 3D object into a fluidized powder bed. Another approach is to apply a conductive primer or anti-static material onto the coating surface, followed by electrostatic powder deposition. Many primer materials are commercially available for powder coating on non-conductive surface.

However, commercially available powders require high curing temperatures, typically from 180° C. to 200° C. or greater. Such temperatures are not suitable for 3D printable materials having low glass transition temperatures or melting temperature or softening temperatures. There is no powder coating material that has low melting temperature, while maintaining good storage stability and other performance requirements and this limits powder coating applications. There is a need for powder coating particles with a low melt curing temperature, in embodiments less than 150° C., while maintaining good storage stability and other requirements for powder coating.

Figure 1:
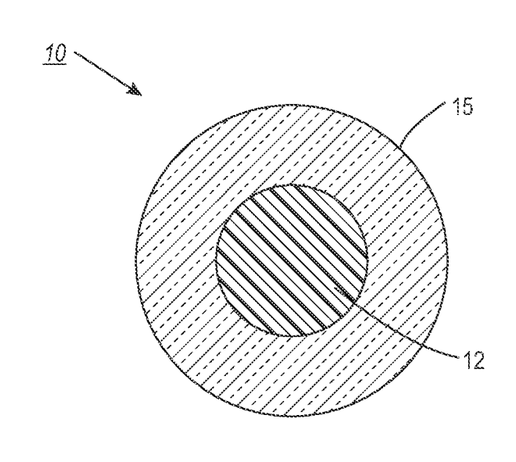
FIG. 1 is a schematic illustration of a core/shell particle disclosed herein.

FIG. 1 is a schematic of the core/shell particle disclosed herein. FIG. 1 is not to scale. The core 12 is a crystalline cross-linkable polyester resin with a melting temperature of less 150° C., or in embodiments a melting temperature of less 120° C., or in embodiments from 40° C. to less than 150° C. The core 12 enables a low melt or curing temperature. The shell 15 enables charging and storage stability. The glass transition temperature of the shell is above 40° C., or in embodiments greater than 50° C., or in embodiments greater than 60° C. The core/shell particle 10 of FIG. 1 has a size of from about 3 microns to about 100 microns, or in embodiments a size of from about 5 microns to about 90 microns, or from about 20 microns to about 80 microns. In embodiments, a cross-linkable crystalline polyester resin is present in an amount of from about 10 to about 90 weight percent of the total weight of the core/shell particle. In embodiments, the cross-linkable crystalline polyester resin is present in an amount of from about 20 to about 80 weight percent of the total weight of the core/shell particle. In embodiments, the cross-linkable crystalline polyester resin is present in an amount of from about 30 to about 70 weight percent of the total weight of the core/shell particle.

Core The core 12 of the core/shell particles 10 of FIG. 1, includes a cross-linkable crystalline polyester resin and a thermal initiator. In addition, the core can optionally contain a cross-linkable amorphous polyester resin. The cross-linkable crystalline polyester resin of the core 12 has a melting temperature of less 150° C., or in embodiments a melting temperature of less 120° C., or in embodiments from 40° C. to 100° C. The core 12 enables a low melt and/or curing temperature. The core 12 can further contain a thermal initiators, colorants, hardening agents, and/or fillers.

Shell

The shell 15 of the core/shell particles 10 contains a cross-linkable amorphous polyester resin. The shell can optionally contain additives on the surface of the core/shell particles. The cross-linkable amorphous polyester resin has a glass transition temperature higher than, for example 40°

C., or in embodiments greater than 50° C., or in embodiments greater than 60° C. The shell, in embodiments, can optionally contain thermal initiator, colorants, hardening agents, and/or additives.

In embodiments, the amount of cross-linkable crystalline polyester component may be in the range of about 20 weight percent to about 85 weight percent based on the total amount of core/shell particles. In embodiments, the cross-linkable amorphous polyester in the core may be the same or different to the cross-linkable amorphous polyester in the shell. The amount of the cross-linkable amorphous polyester included in the core and shell is from about 10 to about 80 weight percent based on the total amount of core/shell particles. In embodiments, the amount of hardening agent may be in a range of from about 5 weight percent to about 55 weight percent based on the total amount of core/shell particles. In embodiments, the thermal initiator can be present, for example, from about 0.01 weight percent to about 5 weight percent based on total curable components of the core/shell particles, including the cross-linkable crystalline, the amorphous polyester and the hardening agents. The amount of the colorant may present in a range from about 5 weight percent to about 10 weight percent of the total core/shell particle weight. In embodiments, the amount of the filer may in a range from about 3 weight percent to about 20 weight percent of the total core/shell particles. The additives are added to the core/shell particles in and mount of from 0.1 weight percent to about 5 weight percent based on the total weight of the core/shell particles.

The core/shell particles disclosed herein possess good melt flow for surface coating and low curing temperatures for final finishing. Furthermore, the particles possess good charging properties suitable for electrostatic deposition, as well good storage stability. The powders disclosed herein can be made via the emulsion aggregation (EA) process to result from spherical to potatoes-like morphology, and with sizes that can range from 5 to 100 microns with narrow size distributions (both volume and number).

Cross-Linkable Crystalline Polyester Resin

In embodiments, the cross-linkable crystalline polyester resin may be formed synthetically, for example, by polycondensation reaction of an unsaturated diacid monomer with a diol optionally in the presence of a catalyst. The unsaturated diacid monomer may include any isomer of unsaturated di-acids, the derivatives of unsaturated diacids, such as esters, anhydrides, acid salts, and the mixture thereof. Examples of unsaturated diacid monomer include fumaric acid, maleic acid, itaconic acid, citraconic acid, the derivatives thereof, and or the mixture thereof. In certain embodiments, the cross-linkable crystalline polyester resin comprises a copolymer formed from polycondensation of one or more diacid monomers with one or more diols, wherein at least one of the one or more diacid monomers is selected from the group consisting of fumaric, maleic, itaconic, citraconic and mesaconic acids and derivatives thereof and/or mixtures thereof. The diacid monomer that may be selected for forming the copolymer include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid (sometimes referred to herein, in embodiments, as cyclohexanedioic acid), malonic acid and mesaconic acid, an ester or anhydride derivative thereof, and the mixture thereof. The unsaturated diacid monomer may be selected in an amount of, for example, in embodiments from about 10 mole percent to about 60 mole percent, in embodiments from about 42 mole percent to about 52 mole percent, in embodiments from about 45 mole percent to about 50 mole percent, and optionally, a second diacid monomer can be selected in an amount from about 1 mole percent to about 40 mole percent of the resin of the resin, in embodiments, the total amount of the diacid monomer being from about 45 mole percent to about 53 mole percent of the resin.

Suitable diols for forming the crystalline cross-linkable polyesters include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like, or mixtures thereof. The diol may be, for example, selected in an amount from about 40 mole percent to about 60 mole percent, in embodiments from about 42 mole percent to about 55 mole percent, in embodiments from about 45 mole percent to about 53 mole percent, and a second polyol can be used in an amount from about 1 mole percent to about 40 mole percent, in embodiments, the total amount of the diol being from about 45 mole percent to about 53 mole percent of the resin.

The catalysts which may be used in the condensation polymerization include tetraalkyl titanates; dialkyltin oxides, such as, dibutyltin oxide; tetraalkyltins, such as, dibutyltin dilaurate; dibutyltin diacetate; dibutyltin oxide; dialkyltin oxide hydroxides, such as, butyltin oxide hydroxide; aluminum alkoxides, alkyl zinc, dialkyl zinc, zinc oxide, stannous oxide, stannous chloride, butylstannoic acid, or combinations thereof. Such catalysts may be used in amounts of, for example, from about 0.01 mole percent to about 5 mole percent based on the amount of starting diacid monomer and diol in the reaction mixture.

In embodiments, the unsaturated or cross-linkable crystalline polyester resin disclosed for the core 12 can be derived from fumaric acid and aliphatic diol(s). Although other di-acid or derivatives listed above can be selected, in embodiments, the amount of fumaric acid may be at least 25 mole % of the polyester resin and in embodiments, 50 mole % of the polyester resin, such that it can crosslink or thermally cure in the presence of thermal initiator or catalyst. In embodiments the unsaturated crystalline polyester resin is derived from fumaric acid and a mixture of 1,4-butanediol and 1,6-hexane-diol.

The unsaturated crystalline polyester resin may possess various melting points of, for example, less than about 150° C., or in embodiments less than about 120° C. or in embodiments from about 40° C. to about 100° C. The crystalline polyester resin may have a number average molecular weight (Mn) as measured by gel permeation chromatography (GPC) of, for example, from about 1,000 to about 50,000, in embodiments, from about 2,000 to about 25,000, and a weight average molecular weight (Mw) of, for example, from about 2,000 to about 100,000, in embodiments, from about 3,000 to about 80,000, as determined by GPC. The molecular weight distribution (Mw/Mn) of the crystalline polyester resin may be, for example, from about 2 to about 6, in embodiments, from about 3 to about 4. The cross-linkable crystalline polyester resins may have an acid value of from about 5 meq KOH/g of polyester resin to about 25 meq KOH/g of polyester resin, or in embodiments, from 8 meq KOH/g of polyester resin to about 23 meq KOH/g of polyester resin, or in embodiments 10 meq KOH/g of polyester resin to about 20 meq KOH/g of polyester resin.

Cross-Linkable Amorphous Polyester Resin

In embodiments, the cross-linkable amorphous polyester resin may be formed synthetically, for example, by polycondensation via an esterification reaction involving an unsaturated polyacid monomer and a polyol optionally in the presence of a catalyst. The polyacid monomer refers to an organic compound having two or more carboxylic groups, and or its derivative such as ester, anhydride or salt, or a combination thereof. In embodiments, the unsaturated polyacid monomer contains one or more ethylenic unsaturation groups. The polyol here refers to an organic compound having two or more hydroxyl groups. In certain embodiments, the cross-linkable amorphous polyester resin comprises a copolymer formed from polycondensation involving one or more polyols and one or more polyacids, wherein at least one of the one or more polyacids comprises an unsaturated polyacid containing an ethylenic unsaturation group.

Examples of polyols which may be used in generating an amorphous polyester resin include aliphatic diols, such as ethylene glycol, 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bisphenol A bis(hydroxyethyl)ether, bisphenol A bis(2-hydroxypropyl)ether, 1,4-cyclohexanedimethanol, 1,3-cyclohexanedimethanol, xylenedimethanol, cyclohexanediol, dietylene glycol, bis(2-hydroxyethyl)oxide, dipropylene glycol, dibutylene glycol, 2,2-dimethylpropane-1,3-diol (neopentyl glycol), hexane-2,5-diol, hexane-1,6-diol, 2,2-bis-(4-hydroxycyclohexyl)-propane (hydrogenated bisphenol-A), and the combinations thereof. The amount of organic polyol can vary, and may be present, for example, in an amount from about 40 mole percent to about 60 mole percent of the resin, in embodiments from about 42 mole percent to about 55 mole percent of the resin, in embodiments from about 45 mole percent to about 53 mole percent of the resin, and a second polyol can be used in an amount from about 1 mole percent to about 30 mole percent, in embodiments, from about 5 to about 25 mole percent of the resin, in embodiments, the total amount of the polyol being from about 45 mole percent to about 53 mole percent of the resin.

Unsaturated polyacid monomer that can be used for preparing a cross-linkable amorphous polyester resin include diacid monomers, such as fumaric, maleic, itaconic, citraconic and mesaconic acids and derivatives thereof and/or mixtures thereof. In embodiments, the cross-linkable amorphous polyester resin comprises a copolymer, wherein other polyacid monomer may be included, in combination with the unsaturated polyacid monomer. Examples of the other polyacid monomer include terephthalic acid, phthalic acid, isophthalic acid, trimellitic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanedioic acid, dimethyl naphthalenedicarboxylate, dimethyl terephthalate, diethyl terephthalate, dimethylisophthalate, diethylisophthalate, dimethylphthalate, phthalic anhydride, diethylphthalate, dimethylsuccinate, naphthalene dicarboxylic acid, dimer diacid, dimethylfumarate, dimethylmaleate, dimethylglutarate, dimethyladipate, dimethyl dodecylsuccinate, and combinations thereof. The unsaturated diacid monomer may be selected in an amount of, for example, in embodiments from about 10 mole percent to about 60 mole percent, in embodiments from about 42 mole percent to about 52 mole percent, in embodiments from about 45 mole percent to about 50 mole percent, and optionally, a second other diacid monomer can be selected in an amount from about 1 mole percent to about 40 mole percent of the resin of the resin, in embodiments, the total amount of the diacid monomer being from about 45 mole percent to about 53 mole percent of the resin.

In embodiments, trifunctional or more functional alcohols or carboxylic acids can optionally be used to obtain branched polyesters. Examples of suitable trifunctional or more functional alcohols or carboxylic acids include but not limited to glycerol, hexanetriol, trimethylol ethane, trimethylol propane, pentaerythritol and sorbitol, trimellitic acid, trimellitic acid anhydride, pyromellitic acid dimethylolpropionic acid (DMPA). Such trifunctional or more functional alcohols or carboxylic acids can be used in an amount from about 0.1 mole percent to about 10 mole percent of the resin, from about 0.2 mole percent to about 8 mole percent of the resin, from about 0.3 mole percent to about 6 mole percent of the resin.

The catalyst suitable for polycondensation in forming the amorphous polyester resin include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide, or combinations thereof. Such catalysts may be used in amounts of, for example, from about 0.01 mole percent to polyester resin.

Suitable unsaturated amorphous polyester resins include those disclosed in U.S. Pat. No. 6,063,827, the disclosure of which hereby is incorporated by reference in entirety. Unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate) and combinations thereof.

The unsaturated amorphous polyester resin may possess various glass transition temperature, for example, greater than about 40° C., or in embodiments greater than about 50° C. or in embodiments from about 60° C. to 90° C. The amorphous polyester resin may have a number average molecular weight (Mn) as measured by gel permeation chromatography (GPC) of, for example, from about 1,000 to about 50,000, in embodiments, from about 2,000 to about 25,000, and a weight average molecular weight (Mw) of, for example, from about 2,000 to about 100,000, in embodiments, from about 3,000 to about 80,000, as determined by GPC. The molecular weight distribution (Mw/Mn) of the amorphous polyester resin may be, for example, from about 2 to about 6, in embodiments, from about 3 to about 4. The cross-linkable amorphous polyester resins may have an acid value of greater than about 7 meq KOH/g of polyester resin to about 25 meq KOH/g of polyester resin, or in embodiments, from 8 meq KOH/g of polyester resin to about 23 meq KOH/g of polyester resin, or in embodiments 10 meq KOH/g of polyester resin to about 20 meq KOH/g of polyester resin.

Thermal Initiator

The thermal initiation system of the composition comprises at least a thermal radical initiator for example a peroxide (a), optionally a catalyst (in the literature is also known as accelerator) (b) for the thermal radical initiator, optionally an inhibitor (c) for the thermal radical initiator. Upon heating, the thermal radical initiator for example a peroxide, generates (free) radicals able to initiate radical crosslinking in the composition of the invention.

Thermal initiators which may be utilized in cross-linking either the crystalline or amorphous polyesters include thermal radical initiators such as organic peroxides, azo compounds, or combinations thereof. Upon heating, the thermal initiator generates (free) radicals able to initiate radical crosslinking the polyester resins of the invention. Such thermal initiators may be utilized in amounts of, for example, from about 0.01 weight percent to about 5 weight percent, based on the starting diacid used to generate the polyester resins. The thermal initiators may have suitable half-life, for example, at least 10 hours, or in embodiments at least 5 hours, at the processing temperatures (100° C.) during the preparation of the core/shell powder coating particles. Illustrative examples of thermal initiator are peresters or monopercarbonates, such as Butyl 4,4-di(tert-butylperoxy)valerate, Cumyl hydroperoxide, Cumyl peroxyneodecanoate, Cumyl peroxyneoheptanoate, Di(2-ethylhexyl) peroxydicarbonate, Di(3,5,5-trimethylhexanoyl) peroxide, Di(3-methoxybutyl) peroxydicarbonate, 2,3-Dimethyl-2,3-diphenylbutane, 2,5-Dimethyl-2,5-di(2-ethylhexanoylperoxy)hexane, 2,5-Dimethyl-2,5-di(tert-butylperoxy)hexane, 2,5-Dimethyl-2,5-di(tert-butylperoxy)hexyne-3, Di(4-methylbenzoyl)peroxide, Di-(tert-amyl)-peroxide, Di(tert-butyl)peroxide, 2,2-Di(tert-butylperoxy)butane, Di(4-tert-butylcyclohexyl) peroxydicarbonate, 1,1-Di(tert-amylperoxy)cyclohexane, 1,1-Di(tert-butylperoxy)-3,5,5-trimethylcyclohexane, 1,1-Di(tert-butylperoxy)cyclohexane, Di(tert-butylperoxy-isopropyl)benzene, Dibenzoyl peroxide, Dicetyl peroxydicarbonate, Dicumyl peroxide, Didecanoyl peroxide, Diisobutyryl peroxide, Diisopropyl peroxydicarbonate, Dilauroyl peroxide, Dimyristyl peroxydicarbonate, Di-sec-butyl peroxydicarbonate, Isopropylcumyl hydroperoxide, Isopropylcumyl hydroperoxide, tert-Amyl hydroperoxide, tert-Amyl peroxy-2-ethylhexanoate, tert-Amyl peroxyacetate, tert-Amyl peroxy-benzoate, tert-Amyl peroxyneodecanoate, tert-Amyl peroxypivalate, tert-Amylperoxy-(2-ethylhexyl)carbonate, tert-Butyl cumyl peroxide, tert-Butyl hydroperoxide, tert-Butyl peroxy-2-ethylhexanoate, tert-Butyl peroxy-3,5,5-trimethylhexanoate, tert-Butyl peroxydiethylacetate, tert-Butyl peroxy-isobutyrate, tert-Butyl peroxyneodecanoate, tert-Butyl peroxyneoheptanoate, tert-Butyl peroxypivalate, tert-Butyl-monoperoxy-maleate, tert-Butylperoxy isopropyl carbonate, tert-Butylperoxy-(2-ethylhexyl)carbonate, tert-Butylperoxy-acetate, tert-Butylperoxybenzoate, 1,1,3,3-Tetramethylbutyl hydroperoxide, 1,1,3,3-Tetramethylbutyl peroxy-2-ethylhexanoate, 1,1,3,3-Tetramethylbutyl peroxyneodecanoate, 1,1,3,3-Tetramethylbutyl peroxypivalate and 3,6,9-Triethyl-3,6,9-trimethyl-1,4,7-triperoxonane, or combinations thereof. In embodiments, other thermal initiators may also include azo compounds such as 1,1'-azobis(cyanocyclohexane) (also known as Vazo 88).

Colorants

The colorants can be a dye, a pigment, a metallic pigment, or combination thereof. As examples of suitable colorants, mention may be made of carbon black like REGAL 330®; magnetites, such as, Mobay magnetites MO8029™ and MO8060™; Columbian magnetites; MAPICO BLACKS™, surface-treated magnetites; Pfizer magnetites CB4799™, CB5300™, CB5600™ and MCX6369™; Bayer magnetites, BAYFERROX 8600™ and 8610™; Northern Pigments magnetites, NP604™ and NP608™; Magnox magnetites TMB-100™ or TMB-104™; and the like. As colored pigments, there can be selected cyan, magenta, yellow, red, green, brown, blue or mixtures thereof. Generally, cyan, magenta or yellow pigments or dyes, or mixtures thereof, are used. The pigment or pigments can be water-based pigment dispersions.

Specific examples of pigments include SUNSPERSE 6000, FLEXIVERSE and AQUATONE water-based pigment dispersions from SUN Chemicals, HELIOGEN BLUE L6900™, D6840™, D7080™D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, CINQUASIA MAGENTA™ available from E.I. DuPont de Nemours & Company and the like. Colorants that can be selected are black, cyan, magenta, yellow and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19 and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, Anthrathrene Blue, identified in the Color Index as CI 69810, Special Blue X-2137 and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide and Permanent Yellow FGL. Colored magnetites, such as, mixtures of MAPICO BLACK™, and cyan components also may be selected as colorants.

Other known colorants can be selected, such as, Levanyl Black A-SF (Miles, Bayer) and Sunsperse Carbon Black LHD 9303 (Sun Chemicals), and colored dyes, such as, Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like. Metallic pigments include aluminum pigments, copper pigments, and the like.

Hardening Agents

In embodiments, the hardening agents are used to increase the crosslinking degree of the cross-linkable resins of the core/shell particles during the curing stage of the powder coating. Suitable hardening agents can be crystalline or amorphous materials, including any organic compound, oligomer or polymer having a vinyl group or other unsaturated group that are able to react with the cross-linkable crystalline and or amorphous polyester resins to form cross-linked coating. The amount of hardening agent can be in a range of from about 5 weight percent to about 50 weight percent, or from about 10 weight percent to about 45 weight percent % of the core composition in the core/shell particles. The hardening agents include acrylates, methacrylates, vinylesters, vinylethers, vinyl amides, propargyl ethers, propargyl esters, allyls and mixtures thereof. Further the hardening agents include crystalline materials such as crystalline vinylesters, and vinylethers, polyurethanes, polyamides, polyureas as well as mixtures thereof. Illustrative example of hardening agent is Uracross™ P3307. The hardening agents include crystalline materials having a melting temperature in a range of for example from about 40° C. to about 150° C.

Fillers

In embodiments, the fillers include inorganic or polymeric materials that are used to enhance the durability of the powder coating. Such materials are selected from the group consisting of metal oxide particles (such as silica, titania, alumina), graphene, carbon nanotubes, polymeric fibrils, and a mixture thereof.

Additives

In embodiments, the additives are disposed on the surface of the core/shell particles to provide improved performance such as charging properties, particle flow, and storage stability. The additives are added to the core/shell particles in an amount of from 0.1 weight percent to about 5 weight percent based on the total weight of the core/shell particles. The additives have a particle size from about 25 nanometers to about 150 nanometers. Suitable additives include silica, titania, alumina, polymeric additives, and a mixture thereof. Examples of polymeric additives include those disclosed in U.S. Pat. No. 8,663,886 and US publication 2012/0156606 both of which are hereby incorporated by reference in their entirety.

Particle Preparation

The core/shell particles may be made by any known technique or process. For example, the core/shell particles can be made using emulsion/aggregation processes as illustrated in a number of patents for the preparation of toners, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797. Also of interest may be U.S. Pat. Nos. 5,348,832, 5,405,728, 5,366,841, 5,496,676, 5,527,658, 5,585,215, 5,650,255, 5,650,256 and 5,501,935 (spherical particles).

Core/shell particles of the present disclosure may be prepared by aggregation and coalescence processes, in which a mixture comprising latex particles of the cross-linkable polyesters are aggregated to the appropriate particle size and then coalesced to achieve the final particle shape and morphology. Further the mixture may optionally include dispersions of colorants, hardening agents, fillers, or a combination thereof, to incorporate these component into the core of the core/shell particles. In embodiments, a shell latex comprising amorphous polyester resin is also added to the aggregated core particles, followed by the coalescence to form a shell of the core/shell particles. The latex particles of the crystalline or amorphous cross-linkable polyesters, can be prepared by any known dispersion technique, such as via phase inversion emulsification. The latex particle size can be in a range of from about 50 to about 500 nanometers, or from about 80 to about 300 nanometers. A thermal initiator can be included into the polyester latexes.

In emulsion aggregation processes, a blend of resin latexes, optionally along with other components (colorant, hardening agent, and filler), are added a suitable reactor, such as a mixing vessel. The blended mixture may then be stirred and heated to a temperature near the $T_g$ of the cross-linkable polyester resin, resulting in core particles as aggregates from about 3 microns to about 100 microns in volume average diameter, or in embodiments of from about 4 microns to about 90 microns in volume average diameter, or in embodiments of from about 10 microns to about 80 microns in volume average diameter. In embodiments, methods further comprise adding the shell latex of polyester resin to the core particles before or during the coalescing step. In embodiments, an amorphous cross-linkable polyester is utilized to form the shell polyester latex. In embodiments, the resin utilized to form the shell may have a glass transition temperature from about 40° C. to about 100° C., in embodiments from about 60° C. to about 90° C. The shell is formed on the core particles. The aggregated core/shell particles are then coalesced by heating to an elevated temperature such as from about 50° C. to about 100 C.

In embodiments, a coagulant may be added to facilitate the aggregation of the latexes and other dispersion components (such as colorants, hardening agent, and fillers). Examples of suitable coagulants include polyaluminum halides such as polyaluminum chloride (PAC), or the corresponding bromide, fluoride, or iodide, polyaluminum silicates such as polyaluminum sulfo silicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, combinations thereof, and the like. The coagulant may be added in amounts from about 0.01 weight percent to about 5 weight percent based on the core/shell particles, and in embodiments from about 0.1 weight percent to about 3 weight percent based on the weight of the core/shell particles.

Method of Surface Finishing 3D Printed Objects

The method of finishing a 3D object begins by providing the 3D object and depositing a plurality of core/shell particles on a surface of the 3D object. The plurality of core/shell particles are described above. The method includes heating the article to a temperature of greater than 100° C. and less than 180° C. to cure the plurality of core/shell particles forming a surface coating of the three dimensional article.

In powder coating, the powder particles are applied onto the coating object by electrostatic deposition or exposing the pre-heated object to a fluidized powder bed, followed by a curing step for final finishing.

Electrostatic powder deposition is suitable for applying the core/shell powder described herein to 3D printed objects having a conductive surface. In electrostatic deposition, a electrostatic spray gun deposits the core/shell particles on the surface of a 3D-printed object having a conductive surface that is grounded. This allows the core/shell particles to adhere to the surface. The 3D printed object is then heated to a temperature of greater than 100° C. and less than 180° C. to cure the plurality of core/shell particles.

In embodiments for coating 3D objects with conductive surfaces, the 3D object can be positioned in a fluidized bed have charged core/shell particles. The core/shell particles attached to the surface and then the 3D printed object is then heated to a temperature of greater than 100° C. and less than 180° C. to cure the plurality of core/shell particles.

For powder coating on non-conductive surface, two approaches can be used: pre-heat the part/object to certain temperature, followed by dipping into fluidized powder bed for particle adhesion or; apply a conductive primer or anti-static material onto the coating surface, followed by electrostatic powder deposition described above. Many primer materials are commercially available for powder coating on non-conductive surface.

Specific embodiments will now be described in detail. These examples are intended to be illustrative, and not limited to the materials, conditions, or process parameters set forth in these embodiments. All parts are percentages by solid weight unless otherwise indicated.

EXAMPLES

The unsaturated or cross-linkable crystalline polyester resin disclosed herein can be derived from fumaric acid and aliphatic diol(s). By varying the ratio of 1,4-butanediol (BD) and 1,6-Hexane-diol (HD), a series of resins with varying melting and re-crystallization temperatures were made and are disclosed in Table 1 below:

TABLE 1

| Unsaturated Crystalline Polyester Resins | | | | | | | |
|---|---|---|---|---|---|---|---|
| | Molar Ratio of Diols | | Viscosity @120° C. | Acid Value milligrams | DSC | | Heat of Fusion |
| Resin | 1,6-HD | 1,4-BD | Centipoise | KOH/gram | $T_m$° C. | $T_c$° C. | |
| GS1477 | 100 | 0 | 80.1 | 11.1 | 114.8 | 85.2 | 114 |
| GS1478 | 50 | 50 | 388 | 11.3 | 61.8 | 10.9 | 41.7 |
| GS1480 | 80 | 20 | 339 | 8.3 | 98.3 | 66.1 | 39.0 |
| GS1486 | 75 | 25 | 170 | 15.2 | 93.0 | 58.6 | 37.7 |

Preparation of crystalline polyester latex: Into a 1 L glass reactor 10.03 g TAYCA POWER BN2060 surfactant (branched sodium dodecyl benzene sulphonate), 6.93 g trimethylamine (TEA) and 200.00 g unsaturated crystalline polyester resin (GS1486) was added. The reactor was heated to 105° C. at a controlled rate. Once the resin began to melt, mixing began at a low speed (<50 RPM). At a reactor temperature of 100° C., DI (deionized) water was fed into the reactor at a rate of 1.0 g/min. Gradually, the mixing speed was increased to 165 RPM and then 200 RPM as the viscosity increased. As latex formed, DI water was fed into the reactor at an increased rate of 2.0 g/min, which was gradually increased to 3.0 g/min and 250 RPM. A total of 300 g of DI water was added. Full cooling was then applied and the reactor temperature was reduced to 25° C. The product was collected into a holding tank and sieved with a 25 μm screen. The latex has an averaged particle size of about 92 nanometers as measured by NANOTRAC® U2275E particle size analyzer.

A latex of an unsaturated amorphous polyester having an averaged particle size around 112 nanometers may be prepared from poly(propoxylated bisphenol A-fumarate) (a glass transition temperature of about 61° C. and an acid value of 14 milligrams KOH/gram) available from Reichold as XP777 resin using conventional phase inversion emulsification process.

A latex containing thermal initiator may be obtained by adding about 1 to 3 wt % of, for example tert-Butyl peroxybenzoate (a half-life of about 10 hours at around 100° C.) or 1,1'-Azobis(cyanocyclohexane) (a half-life of about 10 hours at around 140° C.) before being used for particle preparation.

Core/shell particles with an averaged particle size of about 5.0 to 8.5 micrometers can be prepared via conventional emulsion aggregation (EA) process. The particle core is first formed from aggregation of a mixture comprising 103 parts of the crystalline polyester latex, 35 parts of amorphous polyester latex, optionally 5.5 parts of a cyan pigment, and a suitable amount of aluminum sulfate. Over the aggregated particle core a shell is formed by addition of 105 parts of the poly(propoxylated bisphenol A-fumarate) latex. The final core/shell particles are obtained from coalescence of the aggregated core/shell particles.

Coating of Core/Shell Particles on a 3D-Printed Object

An SLS part was printed with polyamide PA12 powder using a SnowWhite 3D printer. Instead of charging the part, to help affix the core/shell particles to the 3D part, the part was heated in oven for five minutes at 150° C. The part was then dipped into the core/shell particles powder to form a thin layer of coating, then the SLS part was heated in an oven for twenty-five minutes at 150° C. to fix the powder to the surface. The part surface was well coated and glossy. Using a fluidized powder bed or electrostatic spray on the part will improve the smoothness of the initial coating.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims

What is claimed is:

1. A powder coating comprising:
    a plurality of core/shell particles, each particle of the plurality of core/shell particles having a size of from about 3 microns to about 100 microns,
    wherein each particle of the plurality of core/shell particles has a core comprising a cross-linkable crystalline polyester resin having a melting temperature of from about 40° C. to about 150° C.,
    wherein each particle of the plurality of core/shell particles has a shell comprising a cross-linkable amorphous polyester resin having a glass transition temperature greater than 40° C.,
    wherein each particle of the plurality of core/shell particles comprises a thermal initiator and a hardening agent in a range of from 5 weight percent to about 50 weight percent of the core in the core shell particles, wherein the hardening agent is selected from the group consisting of: vinyl esters; vinylethers; vinyl amides; propargyl ethers; propargyl esters; allyls and polyurethanes.

2. The powder coating of claim 1, wherein the core further comprises a cross-linkable amorphous polyester resin.

3. The powder coating of claim 2, wherein the cross-linkable amorphous polyester in the core is the same the cross-linkable amorphous polyester in the shell.

4. The powder coating of claim 1, wherein the cross-linkable crystalline polyester resin comprises a polymer of fumaric acid and an aliphatic diol.

5. The powder coating of claim 4, wherein aliphatic diol is selected from the group consisting of: 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and a combination thereof.

6. The powder coating of claim 1, wherein the cross-linkable amorphous polyester resin comprises a copolymer of at least an unsaturated dicarboxylic acid, an optional organic acid having two or three carboxylic acid, and an organic diol.

7. The powder coating of claim 1, wherein the cross-linkable crystalline polyester and/or the cross-linkable amorphous polyester resin have an acid value in the range of from about 7 milligrams to about 25 milligrams KOH/gram of resin.

8. The powder coating of claim 1, wherein the thermal initiator has a half-life of at least about 10 hours measured at about 80° C. to 100° C.

9. The powder coating of claim 1, wherein the thermal initiator is an organic peroxide or an azo compound.

10. The powder coating of claim 1, wherein the cross-linkable crystalline polyester resin is present in an amount of from about 10 to about 90 wt % of the plurality of core/shell particles.

11. The powder coating of claim 1, wherein the core further comprises a colorant, a hardening agent, or a filler.

12. The powder coating of claim 1, wherein the core/shell particles further comprises a plurality of additives having particle sizes from about 25 nanometers to about 150 nanometers, the plurality of additves selected from the group consisting of silica, titania, alumina, a polymeric additives, and a mixture thereof.

13. A powder coating composition comprising a plurality of core/shell particles:
wherein each particle of the plurality of core/shell particles has a core comprising a cross-linkable crystalline polyester resin of fumaric acid and an aliphatic diol having a melting temperature of less than about 150° C., and a hardening agent,
wherein each particle of the plurality of core/shell particles has a shell comprising a cross-linkable amorphous polyester resin having a glass transition temperature greater than 40° C.,
wherein each particle of the plurality of core/shell particles comprises a thermal initiator wherein the hardening agent in a range of from 5 weight percent to about 50 weight percent of the core in the core shell particles, wherein the hardening agent is selected from the group consisting of: vinyl esters; vinylethers; vinyl amides; propargyl ethers; propargyl esters; allyls and polyurethanes.

14. The powder coating composition of claim 13, wherein the core further comprises a colorant, a hardening agent, or a filler.

15. A three-dimensional (3D) printing method comprising:
depositing a plurality of core/shell particles on a surface of a 3D object, wherein the each of the plurality of core/shell particles comprises;
a size of from about 3 microns to about 100 microns;
a core comprising a cross-linkable crystalline polyester resin having a melting temperature of from about 40° C. to about 150° C.;
a shell comprising a cross-linkable amorphous polyester resin having a glass transition temperature greater than 40° C., and a thermal initiator and a hardening agent in a range of from 5 weight percent to about 50 weight percent of the core in the core shell particles, wherein the hardening agent is selected from the group consisting of: vinyl esters; vinylethers; vinyl amides; propargyl ethers; propargyl esters; allyls and polyurethanes; and
heating the 3D object to a temperature of greater than 100° C. and less than 180° C. to cure the plurality of core/shell particles, forming a surface coating of the 3D object.

16. The method according to claim 15 wherein depositing the plurality of core/shell particles is through an electrostatic powder deposition.

17. The method according to claim 15 wherein, wherein the depositing of the plurality of core/shell particles includes fluidized bed coating.

* * * * *